United States Patent [19]

Whitehead

[11] Patent Number: 4,536,904
[45] Date of Patent: Aug. 27, 1985

[54] FOLDABLE BED FRAME

[75] Inventor: Larry W. Whitehead, Lexington, N.C.

[73] Assignee: Leggett & Platt, Incorporated, Carthage, Mo.

[21] Appl. No.: 433,358

[22] Filed: Oct. 7, 1982

[51] Int. Cl.³ .......................... A47C 19/02; F16B 9/00
[52] U.S. Cl. ........................ 5/201; 5/200 C; 5/200 R; 5/286; 5/288; 248/221.3; 403/393; 403/199; 403/254; 403/316
[58] Field of Search .................. 5/240, 286, 304, 201, 5/200 R, 200 B, 288, 202; 248/221.4, 222.1, 221.3, 222.4, 223.1, 300, 188.1; 403/199, 408, 187, 393, 388, 378, 379, 353, 348

[56] References Cited

U.S. PATENT DOCUMENTS

| 2,715 | 7/1842 | Fowler | 403/348 |
|---|---|---|---|
| 7,035 | 1/1850 | Elder | 403/348 |
| Re. 29,029 | 11/1976 | Harris . | |
| 1,952,094 | 3/1934 | Richardson | 5/288 |
| 2,675,287 | 4/1954 | Sitler | 403/408 |
| 2,882,535 | 4/1959 | Sands | 5/201 |
| 3,182,770 | 5/1965 | Shemet | 403/408 |
| 3,230,555 | 1/1966 | Hooker | 5/285 |
| 3,370,873 | 2/1968 | Holton | 403/408 |
| 3,702,137 | 11/1972 | Evans | 5/288 |
| 3,744,068 | 7/1973 | Harris . | |
| 3,757,361 | 9/1973 | Harris et al. | 5/200 R |
| 3,760,437 | 9/1973 | Hooker . | |
| 3,781,930 | 1/1974 | Spitz | 5/201 |
| 3,945,064 | 3/1976 | Harris et al. . | |
| 3,990,131 | 11/1976 | Okamura | 403/408 |
| 4,070,718 | 1/1978 | Spitz | 5/200 R |
| 4,155,131 | 5/1979 | Harris et al. | 5/288 |
| 4,224,704 | 9/1980 | Nowell . | |
| 4,225,265 | 9/1980 | Hooker et al. | 403/393 |
| 4,231,675 | 11/1980 | Scozzafava | 403/348 |
| 4,276,665 | 7/1981 | Mis . | |

Primary Examiner—Gary L. Smith
Assistant Examiner—Vinh Luong
Attorney, Agent, or Firm—Wood, Herron & Evans

[57] ABSTRACT

An improved knock-down, fold-up metal bed frame is disclosed which provides a sturdy and easily manipulated interconnecting mechanism for the cross-rail portions of the bed frame with a positive interlock between the cross-rail portions. A hand-manipulated positive interlocking mechanism is also provided for a center brace which is employed to interconnect opposed cross-rails or side rails.

5 Claims, 9 Drawing Figures

FOLDABLE BED FRAME

FIELD OF THE INVENTION

This invention relates to bed frames, and particularly to compactly foldable rectangular frames of a knock-down type comprised of two or more frame elements to be fastened together.

BACKGROUND OF THE INVENTION

The type of bed frame to which this invention relates is a rectangular metal frame upon which a mattress and a box spring is typically supported. These frames generally comprise a pair of opposed side rails and a pair of opposed cross-rails which serve to interconnect the side rails, typically adjacent the ends thereof. Legs are ordinarily provided to support the frame.

Bed frames of the foregoing type have generally relied upon clamps, nuts and bolts, metal screws, rigid fingers receivable in slots or apertures, and the like for interconnecting the various frame members together and to maintain the proper spacing between the side rails of the frame. In general, these types of frames have been designed to be knocked-down and then folded up compactly for packaging, storage or transport. The bed frame is typically formed of several elements which are subsequently assembled into a frame for use.

There are notable advantages in assembling the frames in this fashion, that is through the use of either nuts or bolts, clamps, machine screws, etc. In the first instance these fasteners require the use of tools in assembling the bed frame elements. These component fasteners are also generally loose, inasmuch as they are not an integral part of the frame, and may consequently be separated from the frame members and lost. The use of clamps to hold the cross-rails together, for example, also presents a further problem, in that the distance between the side rails can only be accurately determined by a measurement.

A further disadvantage presented by the use of fingers on one frame element which are received in a slot in another element to thereby connect the frame elements is that a positive lock is not formed. That is, the fingers can become loosened such that they back out of the slots, causing the frame elements to become disengaged.

In view of these disadvantages of the aforedescribed bed frames of the prior art, it is desirable to provide an improved bed frame of this type with a mechanism for positively interlocking engagement of the frame elements without the use of fastening elements which may become disassociated from the frame, require tools, or which require more than a modicum of effort to assemble and to disassemble the bed frame.

SUMMARY OF THE INVENTION

In light of the perceived disadvantages of the prior art interconnecting mechanisms for a bed frame it is an object of this invention to provide an improved bed frame which solves the noted problems.

It is another object of this invention to provide a fold-up bed frame of simple construction that can be assembled and disassembled without any tools.

It is another object of the present invention to provide a bed frame that has no attaching means which may become loose or separated from the major components or elements of the bed frame.

It is also an object of this invention to provide a knock-down, fold-up bed frame which is easily assembled and disassembled, having a releasable hand-manipulated mechanism for rigidly interconnecting the cross-rail portions of the bed frame which does not require the use of any tools for so connecting the cross-rail portions, and which is carried by the cross-rail portions. It is an additional object of the invention to provide a mechanism for interconnecting the cross-rail portions of the bed frame with a positive interlock between those portions.

It is yet another object of this invention to provide such a bed frame with a center brace and an improved connecting mechanism for securing the center brace between opposed frame rails. Yet another object is to provide the center brace with a releasable mechanism for positively interlocking the center brace to the frame members between which the center brace extends and is attached. A further object of this invention is to enable use of this interlocking mechanism for the center brace without the need of tools or other implements, such that the brace may be quickly and easily attached to the frame rails. Still another object of the invention is to have no parts which may become disassociated from the center brace interlocking mechanism.

These and other objects are accomplished by the present invention in an improved bed frame which provides a sturdy and easily manipulated interconnecting mechanism for the cross-rail portions of the bed frame with a positive interlock between the cross-rail portions. A hand-manipulated positive interlocking mechanism is also provided for a center arm or brace which can be employed with the bed frame to interconnect opposed cross-rails or side rails. The improved bed frame has no connecting components or fasteners which may become loose or separated from the bed frame.

The knock-down and fold-up type bed frame of this invention generally comprises a pair of side rails and a pair of cross-rail assemblies. The cross-rail assemblies each have two elongate portions which are respectively secured at one end to the side rails in opposed relation to each other. In one embodiment of the invention, the cross-rail portions are connected through the use of a releasable locking mechanism which rigidly and positively interlocks the two opposed cross-rail portions. The releasable cross-rail portion locking mechanism includes a manually graspable and manipulable locking member or key which is rotatably mounted on one cross-rail portion. The locking member is receivable in a first and elongate slot or aperture in the other cross-rail portion. In a preferred form, the cross-rail locking member is a T lock, having a stem and an elongated segment extending radially outwardly from the stem. The locking member is of a sufficient height to extend, when properly oriented, through the first aperture with the cross-rail portions in surface-to-surface relation such that when it is rotated, such as through 90°, the elongate segment of the T lock is in an unaligned configuration relative to the first aperture and thereby engages the other cross-rail portion. The cross-rail portions are thereby positively interlocked.

A protrusion, such as a shouldered rivet on one of the cross-rail portions, is arranged to extend through a second and key-hole slot or aperture in the other cross-rail portion with the cross-rail portions in surface-to-surface relation. Lateral movement of the two cross-rail portions such that the shouldered rivet is forced into the narrower portion of the key-hole slot thereby provides a sturdy and rigid interconnection between the two cross-rail portions in combination with the positive lock provided by the locking member.

In a second embodiment of the improved bed frame of this invention, particularly adapted for a larger or king size bed frame, an elongate intermediate cross-rail section is provided to bridge and interconnect the two cross-rail portions which are respectively secured to the side rails. One end of the intermediate section is rigidly connected to one opposed cross-rail portion through use of the above described crossrail positive interlock mechanism, and the other end of the intermediate cross-rail section is likewise connected to the opposed cross-rail portion through use of a like positive interlock mechanism.

A center support or center brace provides additional bracing and support for the bed frame, particularly a bed frame of a larger size such as a queen or king size. The center brace comprises an elongate rail section which is connected at each end to opposed rails of the bed frame, approximately in the middle of the frame. For example, the center brace may interconnect the side rails, such as in a queen size frame, or alternatively may extend between and interconnect the cross-rail assemblies, such as by connection to the intermediate crossrail sections previously discussed in relation to the king size frame.

The center brace is adapted to be secured to the frame without the use of tools or any separate components. It is further provided with a releasable, hand-manipulated, positive interlocking mechanism to prevent undesired disconnection of the center brace. The center brace connecting and interlocking mechanism comprises a lock plate assembly on each end of the brace. Each lock plate assembly includes a metal base plate having two fingers formed thereon, such as by stamping or punching, which are in laterally spaced relation. The fingers are receivable in slots formed in each of the opposed frame rails to which the center support is connected, the slots being in a spaced relation equivalent to that of the fingers. A detent or locking pin is carried by the base plate and extends through an aperture in the plate generally perpendicularly and upwardly from the surface of the base plate and adjacent one of the fingers. The locking pin is carried on a resilient member, such as a segment of spring steel, which is connected at one end to the base plate urging the pin through the base plate aperture to protrude beyond the surface of the base plate.

In order to secure the center brace in position on the frame, the fingers of each base plate are inserted into the spaced elongate slots in the respective frame rails. Upon lateral movement of the brace after insertion of the fingers into the slots, the fingers engage the surface, such as the top surface, of the respective frame rail. Further lateral movement of the center brace causes the locking pin to pop into or register with one of the finger receiving slots. The brace is thereby locked against further lateral movement until the locking pin is moved out of the slot against the bias imposed by the resilient member. A positive interlocking connection for the center brace of the bed frame is thus provided with the center brace being rigidly secured to the frame without the need of any tools or separate fastener parts, such as rivets or screws.

The improved bed frame of this invention additionally provides for a headboard bracket which includes an upper and lower set of key:hole slots rather than a single set of key-hole slots, as in past brackets. The bracket is attached to a pair of shouldered rivets on each side rail in either an upper or lower position, depending on whether the lower or upper pair of slots is used, respectively. In attaching the headboard bracket in the upper position, for example, the shouldered rivets are inserted through the wider portion of the lower set of key-hole slots and the bracket moved laterally to thereby engage the rivets in the shallower portion of the slots.

The foregoing objectives, features and advantages of the present invention will be more readily understood upon consideration of the following detailed description of the invention taken in conjunction with the accompanying drawings, in which:

DETAILED DESCRIPTION OF THE INVENTION

General Description of the Bed Frame Elements

Figure 1:
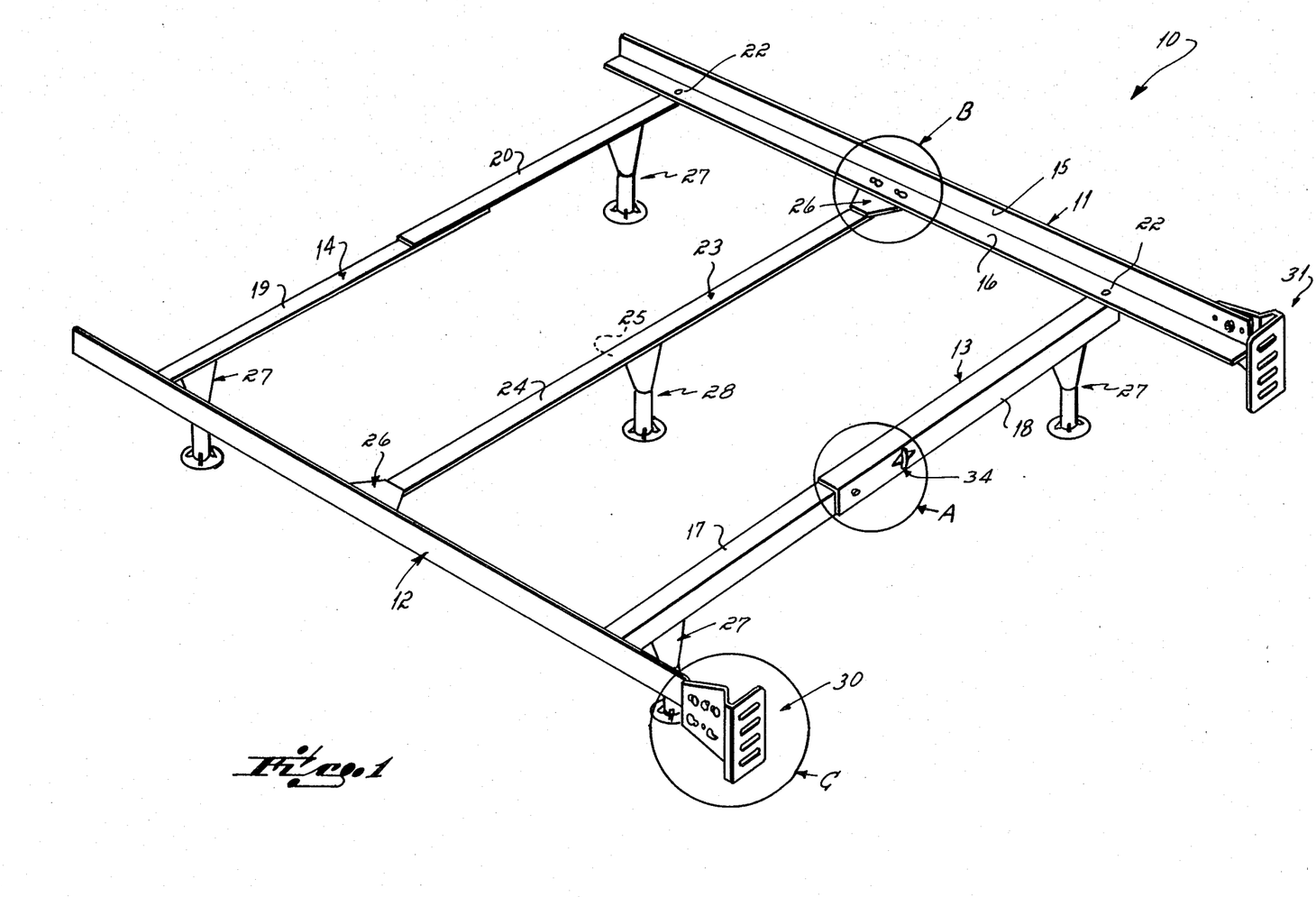
FIG. 1 is a perspective view of one embodiment of the improved bed frame, such as a queen size bed frame, made in accordance with the principles of the present invention.

The bed frame illustrated in FIG. 1 and generally designated by the numeral 10 is a typical rectangular fold-up and knock-down type. As with all frames of this type, the metal bed frame 10 has a pair of opposed side rails 11 and 12 which are in opposed parallel relationship, and a pair of cross-rail assemblies 13 and 14 which are also in opposed parallel relationship. The cross-rail assemblies 13 and 14 extend generally perpendicularly between the side rails 11 and 12 spaced inwardly from the respective side rail ends. The side rails 11 and 12 and the cross-rail assemblies 13 and 14 are preferably L-shaped in axial cross section, but may be of any other suitable shape. Shown here, and exemplary of all the frame rails herein, side rail 11 consists of generally perpendicular parts 15 and 16 of similar transverse widths, part 16 extending generally horizontally and part 15 extending generally vertically. The other side rail 12 and the cross-rail assemblies 13 and 14 are of a similar construction.

The cross-rail assemblies 13 and 14 each consist of a pair of cross-rail portions 17, 18 and 19, 20, respectively. These cross-rail portions are each pivotally connected at one end at a point spaced inwardly from a respective end of a side rail; that is, cross-rail portions 18 and 20 are respectively pivotally connected, such as by rivets 22, to the side rail 11 along the horizontally extending part 16 thereof, and cross-rail portions 17 and 19 are respectively connected to the side rail 12 in a like manner. The cross-rail portions are so arranged that when they are extended generally perpendicular to the respective side rails, the cross-rail portions 17, 18 and 19, 20 can be arranged in juxtaposed relationship and connected, in a manner to be described more fully below, to form a rectangular bed frame. Since the cross-rail portions 17, 18, 19 and 20 are pivotally joined to the side rails, they can be swung inwardly toward the respective side rail to which they are joined for compact storage or transport.

A center support or brace 23 is preferably of a similar structure to that of the side and cross-rails, that is, having a general L-shaped cross section with a generally horizontal part 24 and a vertical part 25 perpendicularly arranged. The center brace 23 provides additional support for the mattress and box spring (not shown) carried by the frame 10, and further provides additional bracing and interconnecting support for the frame itself; such added support is particularly advantageous in the larger bed frames, such as the queen size frame 10 shown here. The center brace 23 is connected at each end to a respective side rail 11 and 12, ordinarily at a point along the side rail equidistant from the cross-rail assemblies 13 and 14. Alternatively, the center brace 23 may be adapted to interconnect the cross-rail assemblies 13 and 14 thereby extending parallel to the side rails in the manner shown in the king size and second embodiment of this invention illustrated in FIG. 5, which will be discussed in more detail below.

Figure 5:
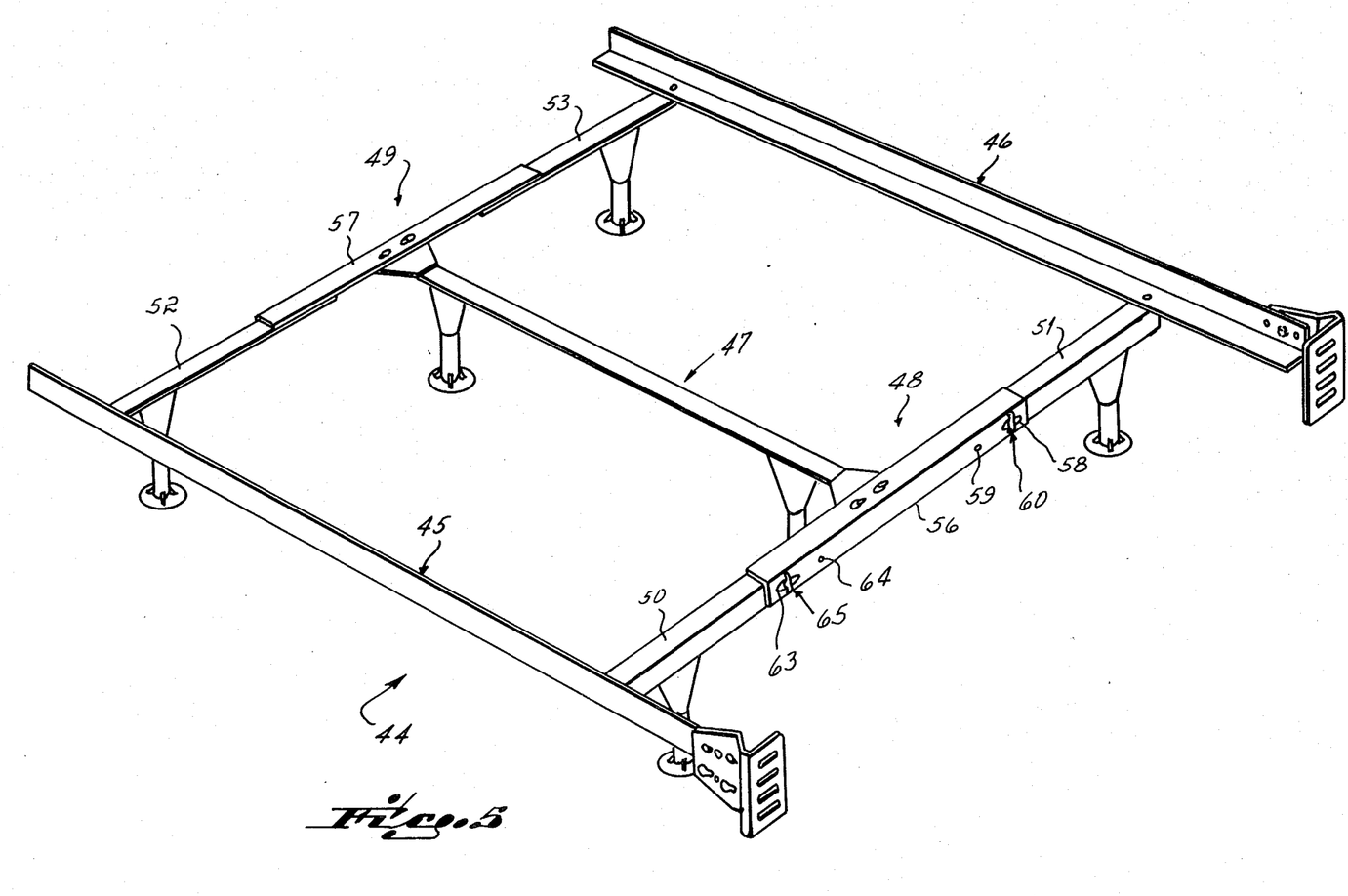
FIG. 5 is a second embodiment of the improved bed frame of this invention as adapted for a larger frame, such as a king size frame.

The connection between the center brace and the respective frame rails of either of the embodiments shown in FIGS. 1 and 5 is accomplished through the use of a locking plate assembly 26 formed on the ends of the center brace, such as center brace 23. This locking plate assembly 26 will likewise be described in detail hereinafter.

The general assembly of the bed frame 10 further includes downwardly depending legs 27 which are of known construction, and which are shown here attached adjacent the four corners of the rectangular bed frame 10 and each respectively carried by the cross frame portions 17, 18, 19 and 20. One or more similar type legs 28 may also be carried by the center brace 24, if desired.

The bed frame 10 also advantageously includes headboard brackets 30 and 31 which are affixed at like ends of the side rails 11 and 12 for use in attaching a headboard to the bed frame. The particular headboard brackets 30 and 31 and their connection with the side rails 11 and 12 will be detailed further below.

The frame elements 11, 12, 13, 14 and 23 may all be formed of an appropriate sturdy material, such as commercially available cold rolled steel.

As will be discussed in the succeeding description detailing the cross-rail interlocking mechanism and the center brace interlocking mechanism, the improved bed frame of this invention provides for the quick and easy assembly and disassembly of the frame without the use of any tools or separate fastener components, such as bolts, screws, clamps, etc., and further provides a positive interlock for both the cross-rail assemblies and the center brace which maintains the various elements of the bed frame in rigid association.

Cross-rail Interlock Mechanism

Figure 2:
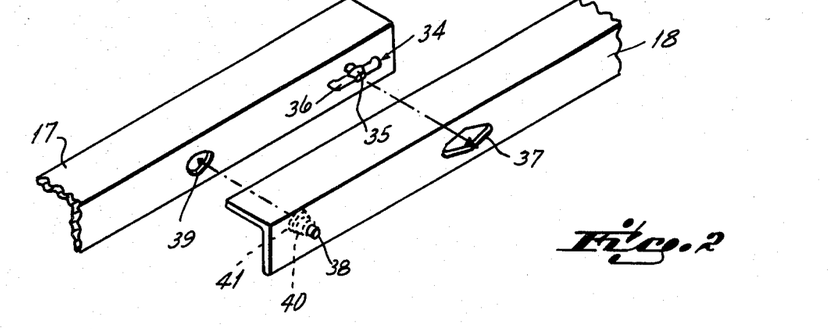
FIG. 2 is an enlarged detail of the cross-rail portions within encircled area labeled A of FIG. 1 with the cross-rail portions disassembled to show a cross-rail interlocking mechanism made in accordance with the principles of this invention.
Figure 3:
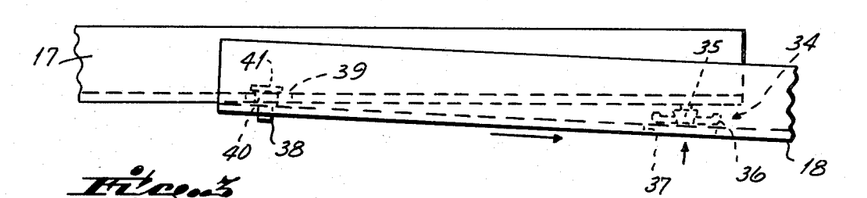
FIG. 3 is a fragmentary plan view of the cross-rail portions detailed in FIG. 2, with the cross-rail portions in a partially assembled configuration.
Figure 4:
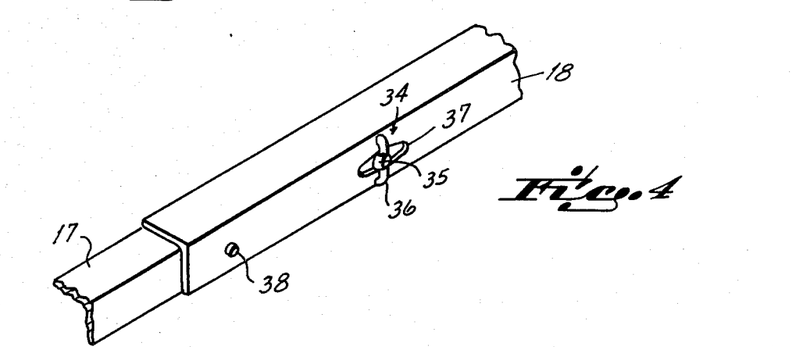
FIG. 4 is a view similar to FIG. 2 showing the cross-rail portions rigidly connected with the positive interlock engaged.

The manner in which the cross-rail portions 17, 18 and 19, 20 are releasably joined together to form the rigid cross-rail assemblies 13 and 14 is particularly shown in FIGS. 2 thru 4. As shown in FIG. 1, two opposed cross-rail portions, such as portions 17 and 18, are pivotally connected to the side rails 11 and 12 such thatwhen the frame 10 is assembled, the two portions 17 and 18 can be positioned in surface-to-surface adjacency with respect to one another.

The interconnection and interlocking mechanism for rigidly connecting the cross-rail portions includes a releasable locking member 34 which comprises, in its preferred form, a T shaped member or key having a stem portion 35 which is rotatably fixed to the cross-rail portion 17 adjacent the end thereof, and an elongate portion 36 which extends radially outwardly from the stem 35. The T lock 34 is receivable in the elongate diamond shaped aperture 37 formed in the cross-rail portion 18 spaced inwardly from the end thereof. The T lock 34 is of a sufficient height such that when the cross-rail portions 17 and 18 are juxtaposed, the T lock will extend through the slot 37 with the manually graspable elongate portion 36 free to rotate. The clearance of the elongate portion 36 should be adjusted so that it is slightly above or slightly contacts the surface of the cross-rail portion 18 surrounding the diamond shaped slot 37 when rotated.

Cooperating with the releasable locking member 34 to retain cross-rail portions 17 and 18 against separation and positioned in surface-to-surface adjacency with respect to one another is a protrusion 38, preferably in the form of a shouldered rivet extending inwardly from the cross-rail portion 18. The rivet 38 is receivable in a key-shaped slot 39 which is provided in the cross-rail portion 17. The rivet has a shank 40 which is similar in width but no wider than the width of the narrowest portion of the slot 39, and has an enlarged head or shoulder 41 with a diameter larger than the width of the narrowest portion of the slot 39 but smaller than the widest portion of the slot. The shank portion 40 has a length such that the head 41 is spaced from the surface of the cross-rail portion 18 by a distance at least as great as the thickness of the cross-rail portion 17, thereby permitting the head 41 of the rivet to clear the wall of the cross-rail portion 17 and engage the surface of the cross-rail portion 17 when the rivet is laterally moved into the narrowest portion of the slot 39.

In order to engage and positively lock the cross-rail portions 17 and 18 together, the cross-rail portions 17 and 18 are brought together in relative surface-to-surface adjacency (FIG. 3). The rivet 38 is positioned within the key slot 39 and one or the other of the cross-rail sections is laterally moved relative to the other so that the shank 40 of the shouldered rivet is registered in the narrowest portion of the slot 39. The T lock 34 is thereupon extended through the diamond shaped slot 37 in the cross-rail portion 18, and the elongate portion 36 manually rotated through about 90° to thereby positively interlock the cross-rail sections against further movement. As can be seen, a rigid interconnection of the cross-rail portions 17 and 18 can be executed simply and rapidly without the need of any additional tools or separable fastener components. An identical interconnecting and interlocking mechanism is provided for the cross-rail sections 19 and 20 forming the cross-rail assembly 14.

Although this illustrated embodiment of the invention provides for the rivet 38 and T lock 34 on different cross-rail portions, the corresponding slots 37 and 39, respectively, being likewise on different cross-rail portions, it should be recognized that the T lock 34 and the rivet 39 may both be on the same cross-rail portion, with the corresponding slots both being on the other and opposed cross-rail portion.

A second embodiment of the positive interlocking mechanism for the interconnection of cross-rail portions of a bed frame is shown in FIG. 5. This relatively larger bed frame, or king size bed frame, is generally indicated at 44. It is similar in structure to the previously described queen size embodiment, including rails 45, 46, center brace 47, and cross-rail assemblies 48 and 49.

The cross-rail assemblies 48 and 49 comprise cross-rail portions 50, 51 and 52, 53, respectively, which are pivotally connected at one end to a cross-rail, as previously described. The cross-rail assemblies 48 and 49 each further include an elongate intermediate cross-rail section 56 and 57, respectively, which serves to bridge and interconnect the respective opposed cross-rail portions in a manner to be described immediately hereinafter. The intermediate cross-rail sections 56 and 57 are of a similar structure to that of the frame rails in general, being made of rigid metal and having an L-shaped axial cross section.

The intermediate cross-rail sections 56 and 57 are used to releasable yet rigidly interconnect the respective opposed cross-rail portions utilizing the releasable positive interlock mechanism previously detailed. For example, intermediate cross-rail portion 56 is provided at one end with an elongate diamond shaped slot 58 and a protrusion or shouldered rivet 59 in a similar arrangement to that disclosed in regard to cross-rail portion 18 of the cross-rail assembly 13. Likewise, the cross-rail portion 51 of this king size frame embodiment is provided with a correspondingly arranged T lock 60 and key slot aperture (not shown) in which the rivet 59 is received. The opposite end of the intermediate cross-rail section 56 is a mirror arrangement of a diamond shaped aperture and inwardly facing rivet, 63 and 64, respectively, which cooperate with a T lock 65 and a key slot aperture (not shown) on the cross-rail portion 50. Assembly of the cross-rail assembly 48 of this embodiment is accomplished by first connecting and interlocking the intermediate cross-rail section 56 to one cross-rail portion, such as cross-rail portion 51, in the manner previously described, and then connecting and interlocking the other end of the intermediate cross-rail section 56 to the other side rail portion, such as cross-rail portion 50, in a like manner. It should be understood that the other cross-rail assembly 49 is of a like construction in this embodiment, and is rigidly and releasably interconnected and interlocked in a like manner.

From the foregoing detailed description of the cross-rail interlocking mechanism illustrated in both of these embodiments, it will be appreciated that this interlocking mechanism permits the ready and easy assembly of the cross-rail portions of a fold-up and knock-down type bed frame without the need of any tools, and without separate fastener components. Assembly and disassembly are rapidly effected, with the various portions of the cross-rail assemblies being rigidly and positively connected against both transverse and longitudinal movement or otherwise disconnected, unless desired.

Center Brace Interlock Mechanism

A center brace is provided for the bed frame for additional support for the mattress and box spring carried by the frame, as well as for additional interconnecting support for the frame itself. A center brace, such as center brace 23, ordinarily extends between two opposed rails, such as the side rails 11 and 12 of the queen size bed in FIG. 1. The center brace extends generally parallel to and approximately equidistant from the cross-rail assemblies 13 and 14. Alternatively, the center brace 47 may extend between and connect the cross-rail assemblies, such as the cross-rail assemblies 48 and 49 of the king size bed (FIG. 5), extending generally parallel to and equidistant from the side rails 45 and 46 thereof.

Figure 6:
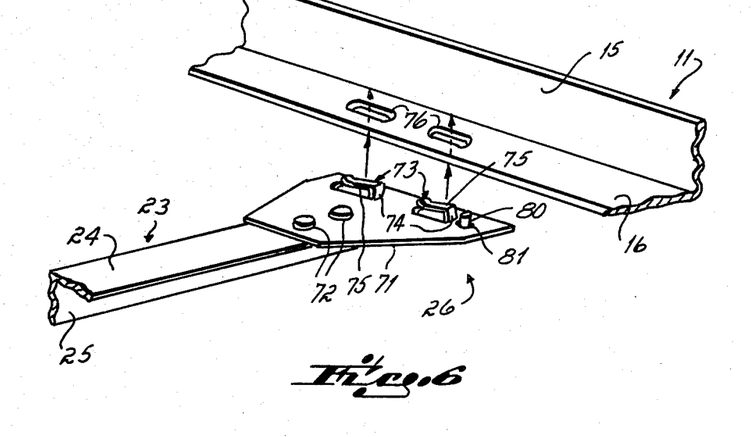
FIG. 6 is an enlarged detail of the side rail and center brace assembly within the encircled area labeled B of FIG. 1 with the center brace disassembled from the side rail for illustration.

The improved mechanism for attaching and locking the center brace, such as center brace 23, to the rails of the bed frame, such as side rails 11 and 12, comprises a lock plate assembly generally indicated at 26 and best shown in FIG. 6. The lock plate assembly 26 comprises a metal base plate 71 which has been rigidly fixed to the horizontal upwardly facing surface 24 of the cross brace 23, such as by rivets 72 and/or by welding. The peripheral shape of the base plate 71 itself is of no particular significance herein. Two locking tabs or fingers 73 are provided extending upwardly from the surface of the plate base 71, such as by stamping or punching in a known manner. These fingers 73 are in a general L shape having a vertical segment 74 extending upwardly from the base plate 71 and an integral generally horizontal segment 75 extending horizontally and slightly downwardly terminating in an upturned leading edge. The fingers 73 are in spaced relation on the base plate 71, both extending in the same direction.

The fingers 73 are receivable in elongate slots or apertures 76 which are formed in the horizontally extending part 16 of the side rail 11. The slots are suitably spaced and sized to allow the fingers 73 to pass upwardly therethrough when the base plate 71 is brought into facial engagement with the underside of side rail horizontal part 16. The height of the fingers 73 is sufficient to allow the fingers to clear the wall of the slots 76. With the fingers so oriented in the slots, appropraite lateral movement of the center brace 23 and base plate 71 will cause the depending portion of the horizontal segment 75 of the fingers 73 to engage the surface of the side rail part 16 to form a rigid connection.

Figure 7:
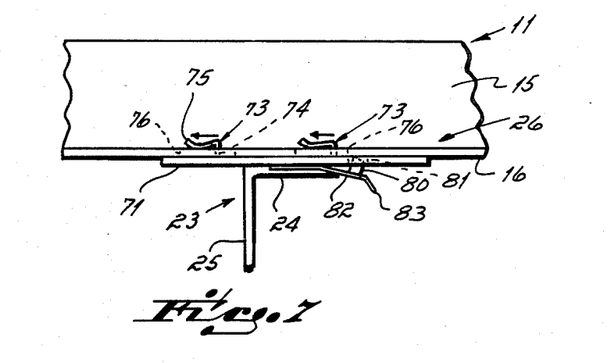
FIG. 7 is a fragmentary elevational view of the center brace and side rail shown in FIG. 6 taken from the outside of the bed frame with the center brace and side rail in partly assembled form.

A positive locking mechanism is provided for the lock plate assembly 26 for retaining the center brace against unintended separation, such as may occur through backing out of the finger during normal use. The positive locking mechanism comprises a locking pin 80 which is resiliently biased to extend upwardly through an aperture 81 in the base plate 71 adjacent the vertically extending portion 74 of a finger 73. As best shown in FIG. 7, the cylindrical shaped pin 80 is carried on a biasing member, such as a piece of spring steel 82, which is rigidly connected at one end to the bottom of the base plate 71, as by welding. The pin 80 is of a sufficient vertical height so that it will extend through the plate aperture 81 and also above the height of the wall of the slot 76. The pin 80 is spaced from the vertical portion 74 of finger 73 in a distance approximating the long length of the slot 76, as measured from the inboard side of the vertical portion 74 of the finger to the outboard side of the pin 80.

Figure 8:
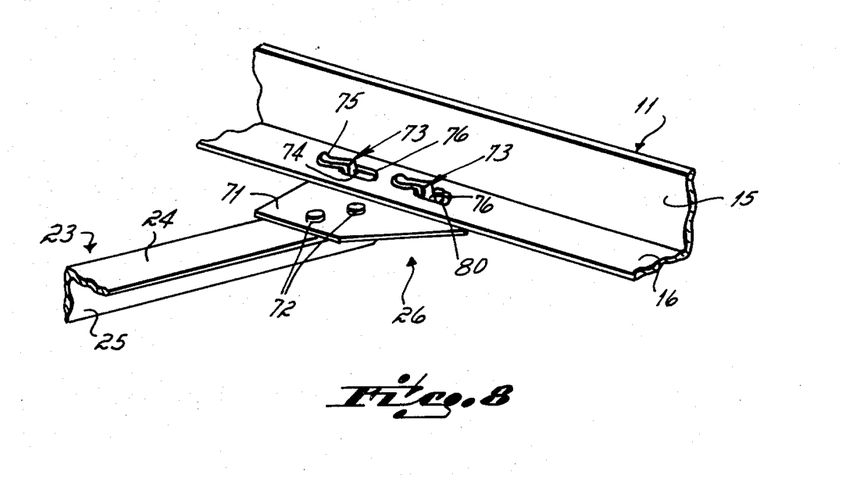
FIG. 8 is a view similar to FIG. 6 showing the center brace connected with the side rail and locked into position.

As particularly shown in FIGS. 7 and 8, engagement of the pin 80 in the slot 76 is automatically accomplished through the connection of the center brace to the side rails discussed above. More specifically, when the fingers 73 are initially received within the slots 76, the pin 80 is forced downwardly by the underside of the side rail and against the bias of the spring steel 82. The pin 80 rides along the lower surface of the side rail as the fingers are being registered until it pops through the slot 76 at approximately the point of registration of the vertical portion 74 of the finger with the wall of the slot. The cross brace is thus provided with a positive lock, thereby preventing undesired separation of the center brace from the side rail. In order to disassemble the center brace from the side rail, the pin 80 is forceably pressed back through the slot 81 against the bias of the spring steel 82 thereby permitting lateral movement of the fingers 73 and their consequent removal from the slots 76. Alternatively, the pin 80 may be pulled downwardly in the aperture 81 through the use of a depending portion 83 of the spring steel, which is manually graspable.

An identical center brace interconnecting and interlocking mechanism is provided on the opposite end of the center brace 23 for engagement with the side rail 12. The center brace 47 of the king size embodiment is likewise provided with similar interconnecting and interlocking mechanisms at each end for interconnection of the brace with the intermediate cross-rail portions 56 and 57.

The center brace interlock mechanism of this invention thus provides for the simple and rigid connection of the center brace to opposed rails of the bed frame without the need of additional tools or separate fastener components, and further provides a positive interlock for the cross brace connection which is automatically engaged upon interconnection of the brace with the rails, and which is simply disengaged when separation of the elements is desired.

Headboard Bracket

Headboard brackets 30 and 31 (FIG. 9) are advantageously provided on a bed frame, such as queen size bed frame 10, at the end of the frame which may be termed the head end of the bed, and are secured at one end of the side rails, such as rails 11 and 12. Each of the headboard mounting brackets 30 and 31 consists of a generally L-shaped member having perpendicularly extending longitudinal and transverse parts 84 and 85. The transverse part 85 has horizontally extending elongate slots 86 formed therein for receiving fasteners by which a headboard is secured to the mounting bracket. The longitudinal part of the bracket 84 is provided with two pairs of key-hole slots, specifically upper key hole slot 87 and lower key-hole slots 88. The slots of the respective pairs are in lateral spaced relation, with the upper slots 87 vertically spaced above the lower slots 88. Holes 89 and 90 are respectively located between each of the pairs of slots, upper hole 89 being vertically above lower hole 90.

Figure 9:
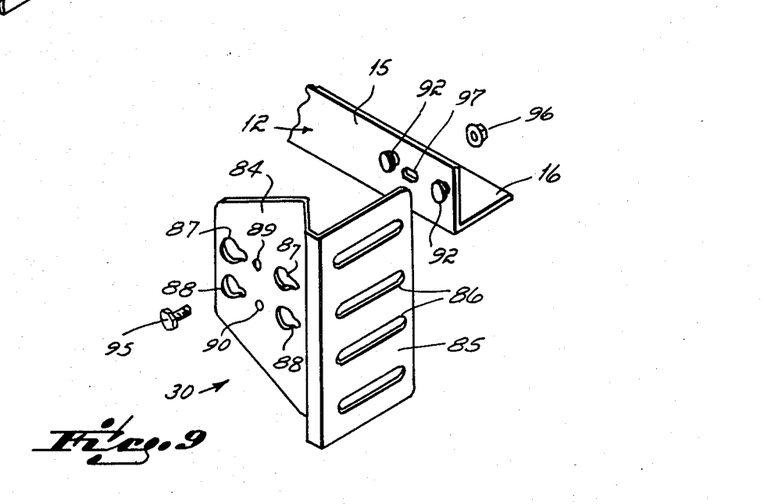
FIG. 9 is an enlarged detail of the encircled area labeled C of FIG. 1 showing the headboard bracket, the drawing being disassembled for clarity.

A pair of laterally spaced protrusions, such as shouldered rivets 92 are provided on the outwardly facing portion of each side rail, such as side rail 12, adjacent the end thereof. These rivets 92 are appropriately spaced such that when the longitudinal part 84 of the headboard bracket 30 is brought into facial engagement with the outside of the side rail 12 with a pair of slots, such as upper slots 87, appropriately aligned with the shouldered rivets, the shouldered rivets will extend through the key hole slots. The shouldered rivets 92 are of a sufficient height so that when the headboard bracket 30 is moved appropriately laterally, the shank of the rivet will engage the narrower portion of the key hole slot with the shoulder of the rivet retaining the headboard bracket against transverse movement.

The upper and lower pairs 87 and 88 of key-hole slots permits the bracket to be used in a lower or upper position respectively, as desired. Additionally, the bracket 30 may be reversed such that the transverse part 85 extends outwardly in a direction opposite to that illustrated in FIG. 9 in order to accommodate a wider setting for a headboard.

Additional fixation of the brackets 30 and 31 in the form of a bolt and nut 95 and 96, respectively, is provided to fix the bracket against undesired lateral movement when engaged with the side rail 12. The bolt is simply inserted in the appropriate upper or lower slot 89 or 90 which is in alignment with an aperture 97 formed in the side rail 12 intermediate the shouldered rivets 92, and the nut 96 secured in place.

It will thus be apparent that an improved knockdown fold-up type bed frame has been provided which is quickly and easily assembled, and which does not require the use of any tools or separable fastener means in the assembly of the cross frame portions and the center brace attachment. The invention provides for a sturdy, rigid interconnection of the various elements of the bed frame with a positive interlock for the cross-rail portions and the center brace.

While the principles of this invention have been described above in connection with specific preferred embodiments of the invention, it is to be clearly understood that this description is made only by way of example and not in limitation of the scope of the invention. What is claimed is:

1. An improved interlock mechanism for joining an elongate center brace to a bed frame, the center brace having two ends, the center brace being joined at its ends to opposed rails of the bed frame, comprising:
   a plate having two fingers formed thereon in laterally spaced relation, the fingers receivable in slots formed in each of the opposed rails to which the center support is joined, the slots being in equivalent spaced relation to the fingers,
   a locking pin carried by the plate and extending generally perpendicularly from the surface thereof, the locking pin being adjacent one of the fingers and extending through an aperture in the plate, and resilient means urging the pin through the aperture,
   the lock plate serving to positively lock the center brace in position on the rails when the fingers are inserted through the slots and the plate laterally shifted in one direction whereby the locking pin registers in a slot which has received a finger thereby preventing lateral motion of the center brace in the opposite direction.

2. The improved center brace interlock mechanism of claim 1 wherein the resilient means is a spring steel member carried on the plate.

3. In a bed frame having a pair of elongate side rails and a pair of cross-rails, the cross-rails each having two elongate sections each pivotally secured at one end to a different side rail adjacent an end of the respective side rail, the improvement comprising:

releasable locking means for rigidly interconnecting two opposed cross-rail sections, the releasable locking means comprising, a manually graspable locking member rotatably mounted on one cross-rail section, the member having a stem and an elongate segment extending radially from the stem, the cross-rail section having a first aperture spaced from the locking member, a protrusion on the other cross-rail section, the cross-rail section having a second and elongate aperture spaced from the protrusion, the locking member being receivable in a first orientation in the second and elongate aperture and the protrusion being receivable in the first aperture when the two cross-rail sections are aligned and juxtaposed such that the cross-rail sections are rigidly connected with a positive lock formed by rotating the locking member to a second orientation;

an elongate center brace having two ends, the center brace being joined at its ends to the opposed rails of the bed frame by means of a lock plate mechanism, the lock plate mechanism comprising, a plate having two fingers formed thereon in laterally spaced relation, the fingers receivable in slots formed in each of the opposed rails to which the center support is joined, the slots being in equivalent spaced relation to the fingers, a locking pin carried by the plate and extending generally perpendicular from the surface thereof, the locking pin being adjacent one of the fingers and extending through an aperture in the plate, the pin being urged through the aperture by resilient means, the lock plate serving to positively lock the center brace in position on the rails when the fingers are inserted through the slots and the plate laterally shifted in one direction whereby the locking pin registers in a slot which has received a finger thereby preventing lateral motion of the center brace in the opposite direction;

a pair of headboard brackets, each attachable to a side reail adjacent the end thereof, each side rail having a pair of outwardly facing laterally spaced protrusions thereon, the headboard bracket comprising, an L-shaped member having a longitudinal and transverse part, plural elongate slots formed on the transverse portion for receiving a headboard attaching means, a pair of upper and laterally spaced slots, a pair of lower and laterally spaced slots, the pairs of slots being each so spaced to receive the side rail protrusions therein, the protrusions having means thereon to engage the bracket against movement in an outward direction.

4. An improved bed frame comprising:

a pair of opposed side rails, a cross-rail section pivotally connected at one end adjacent a respective end of each of the side rails, each of the cross-rail sections having a surface capable of aligned facial engagement with the surface of an opposed cross-rail section to make a cross-rail, one of two opposed cross-rail sections having a manually graspable locking member rotatably mounted thereon, the locking member having a stem extending generally perpendicular to the surface on which it is mounted, and an elongate segment extending radially therefrom, the other opposed cross-rail section having a first aperture defined therein adapted to receive the locking member when the elongate segment is in a first position and through which the elongate segment of the locking member completely extends when in the first position, the locking member positively locking the opposed cross-rail sections together when the elongated segment is rotated to a second position, additional means for further securing the opposed cross-rail sections together and preventing separation thereof, an elongate center brace having two ends, the center brace being joined at its ends to the opposed rails of the bed frame by means of a lock plate mechanism, the lock plate mechanism comprising:

a plate having two fingers formed thereon in laterally spaced relation, the fingers being receivable in slots formed in each of the opposed rails to which the center support is joined, the slots being in equivalent spaced relation to the fingers, a locking pin carried by the plate and extending generally perpendicular from the surface thereof, the locking pin being adjacent one of the fingers and extending through an aperture in the plate, the pin being urged through the aperture by resilient means, the lock plate serving to positively lock the center brace in position on the rails when the fingers are inserted through the slots and the plate laterally shifted in one direction whereby the locking pin registers in a slot which has received a finger thereby preventing lateral motion of the center brace in the opposite direction.

5. The improved bed frame of claim 4 further including a pair of headboard brackets, each bracket attachable to a side rail adjacent the end thereof, each side rail having a pair of outwardly facing laterally spaced protrusions thereon, the headboard bracket comprising:

an L-shaped member having a longitudinal and transverse part, plural elongate slots formed on the transverse portion for receiving a headboard attaching means, a pair of upper and laterally spaced slots, a pair of lower and laterally spaced slots, the pairs of slots being each so spaced to receive the side rail protrusions therein, the protrusions having means thereon to engage the bracket against movement in an outward direction.

* * * * *

UNITED STATES PATENT AND TRADEMARK OFFICE
CERTIFICATE OF CORRECTION

PATENT NO. : 4,536,904
DATED : Aug. 27, 1985
INVENTOR(S) : Larry W. Whitehead

It is certified that error appears in the above-identified patent and that said Letters Patent is hereby corrected as shown below:

Column 1, line 28, "advantages" should read as
-- disadvantages --

Signed and Sealed this

Thirtieth Day of September 1986

[SEAL]

Attest:

DONALD J. QUIGG

Attesting Officer

Commissioner of Patents and Trademarks